United States Patent [19]

Yamazaki

[11] Patent Number: 4,938,057
[45] Date of Patent: Jul. 3, 1990

[54] PARKING BRAKE DEVICE

[75] Inventor: Takeo Yamazaki, Anjo, Japan

[73] Assignee: Aisin Seiki Kabushiki Kaisha, Kariya, Japan

[21] Appl. No.: 314,967

[22] Filed: Feb. 24, 1989

[30] Foreign Application Priority Data

Feb. 26, 1988 [JP] Japan .............................. 63-25806[U]

[51] Int. Cl.$^5$ ............................................ G01M 19/00
[52] U.S. Cl. .................................................... 73/118.1
[58] Field of Search .......... 200/61.89, 61.44, 61.58 R, 200/61.85, 61.87, 335, 535; 340/457.3; 73/118.1, 132,

[56]  References Cited

U.S. PATENT DOCUMENTS 4,181,834  1/1980  Kyonomine ...................... 200/61.89

FOREIGN PATENT DOCUMENTS 605271  4/1978  U.S.S.R. ............................... 200/335

Primary Examiner—Jerry W. Myracle
Attorney, Agent, or Firm—Burns, Doane, Swecker & Mathis

[57]  ABSTRACT

A parking brake device is provided in which an actuating arrangement is positioned on a fixed bracket and cooperates with a spring device so as to control a switch system. The spring device is mounted on the parking brake device so as to ensure proper contact with the switch while reducing vibration and resultant noise.

4 Claims, 1 Drawing Sheet

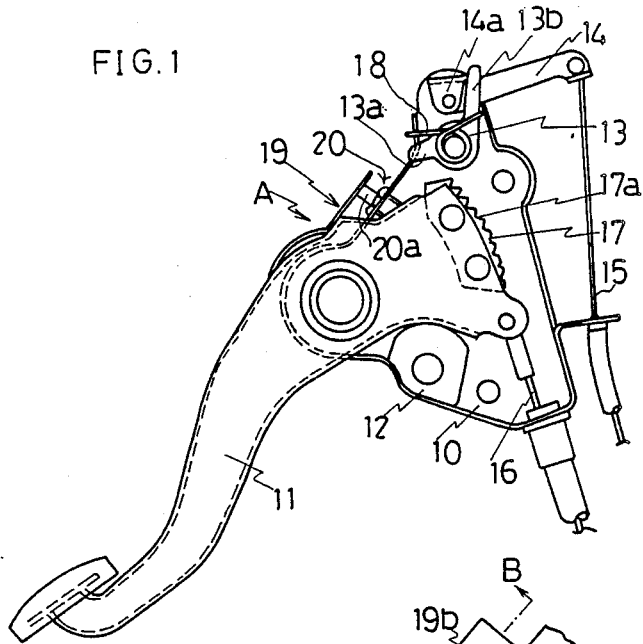
FIG. 1
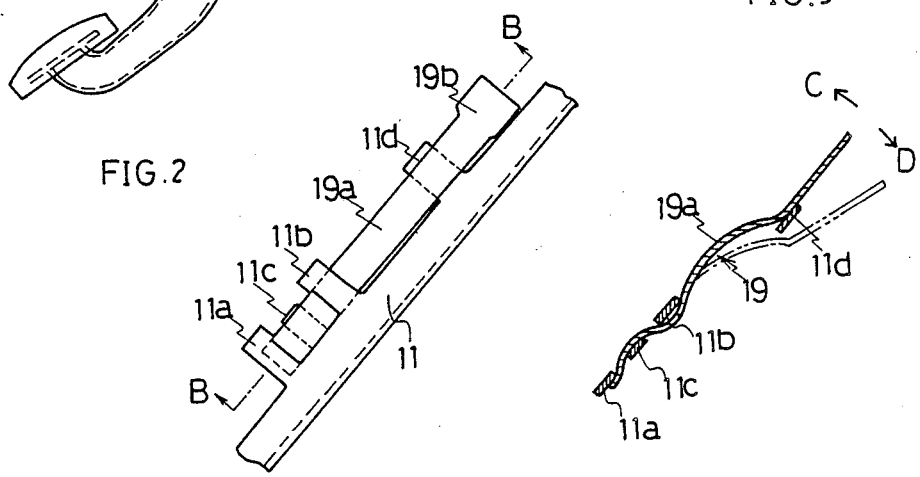
FIG. 2
FIG. 3
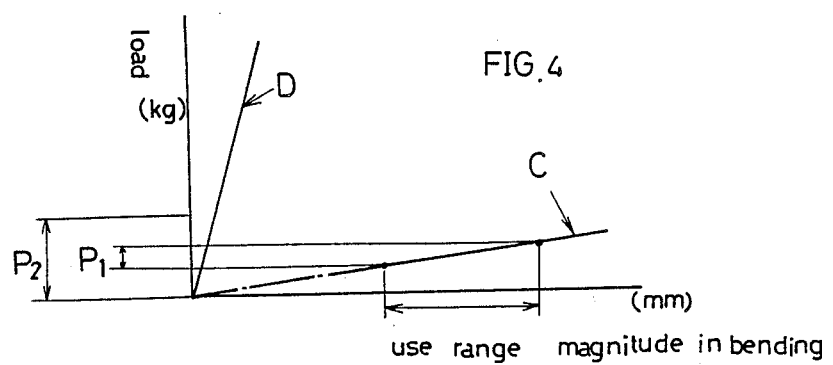
FIG. 4

PARKING BRAKE DEVICE

BACKGROUND OF THE INVENTION

1. Field of the Invention

This invention relates to a parking brake device for vehicles and more particularly to improvements in contact structure of a parking brake switch in a manipulating device for the parking brake.

2. Description of the Related Art

Conventionally, a parking brake device of the foot operated pedal type, as shown in Japanese Utility Model Laid Open Application No. 56-21262, has a bracket secured to a vehicle body, a brake pedal rotatably pivoted on the bracket and a switch connected to the bracket by means of a leaf spring. The switch includes a switch actuating means which is actuated by the parking brake pedal when the pedal is returned in its original position.

In the foregoing device, the parking brake pedal is subject to overtravel past its original position, due to inertia, when the pedal is released for its return to its original position. Therefore, due to the inertia arising from the force of the return, a stopper for the pedal may be bent and a leaf spring provided with the switch may be elastically deformed. This prevents the damages of the switch due to the over stroke of the switch actuating means by the parking brake pedal.

The above-discussed switch is of the on-off type which is controlled by the biasing force of a leaf spring and the biasing force of another spring positioned within the switch to urge the switch actuating means against the leaf spring. Difficulty has arisen in setting the spring constants of the two springs and to set the on-off position of the switch. This results in less reliability in the switch operation and in less durability in the switch. In case that the load or biasing force of the leaf spring is substantially less than that of another spring due to differences in manufacturing and assembling of the leaf spring, the switch actuating means moves insufficiently when the parking brake pedal returns and the switch may not be actuated. If the load or biasing force of the leaf spring is excessively larger than that of another switch, the switch actuating means moves a distance greater than the required magnitude and the durability of the switch is less. Furthermore, in the above device, since the amplitude and spring constant of the leaf spring may be the same in both directions when the leaf spring is bent to the bracket, the leaf spring is alternately vibrated in both directions when the parking brake pedal is returned under shock conditions. This results in vibration noises and the durability of the leaf spring per se is decreased. These drawbacks may be overcome by a special arrangement where the switch is directly mounted on the bracket and the magnitude in bending of the stopper is set within the range of the stroke of the switch actuating means. However, this increases noise when the pedal is returned and reduces freedom of the design with a limited mounting of parts.

SUMMARY OF THE INVENTION

It is, therefore, an object of the present invention to provide an improved manipulating device for a parking brake device which obviates various drawbacks mentioned above.

It is another object of the present invention to provide an improved manipulating for a parking brake device wherein reliability of the switch operation is increased.

It is still another object of the present invention to provide an improved manipulating device for a parking brake device which is simple in construction and has a high reliability for the switch operation.

According to the present invention, a manipulating device for a parking brake comprising a bracket secured to a vehicle body, a parking brake actuating means movably positioned on the bracket, a leaf spring means having one end which is secured to the bracket or the parking brake actuating means and a switch mounted on either one of the bracket and the parking brake actuating means and having a switch actuating means which is brought into contact with the other end of the leaf spring means when the parking brake actuating means is returned into its original position, and the vicinity of the other end of the leaf spring being elastically held with a predetermined bent condition in opposition to the direction into which the switch actuating means is moved by the parking brake actuating means.

BRIEF DESCRIPTION OF THE DRAWINGS

Various other objects, features and attendant advantages of the present invention will be fully appreciated as the same becomes better understood from the following detailed description when considered in connection with the accompanying drawing in which:

FIG. 1 is a cross-sectional view showing an embodiment of the present invention, FIG. 2 is an enlarged view seen from arrow A in FIG. 1, FIG. 3 is a cross-sectional view taken along the line B—B in FIG. 2 and FIG. 4 is a characteristic view showing a relation between a load (mm) and a magnitude in bending of a leaf spring according to the present invention.

DETAILED DESCRIPTION OF A PREFERRED EMBODIMENT

Referring now to the drawing showing an embodiment of the present invention, a manipulating device for a parking brake of the pedal type for vehicles comprises a bracket 10 which is secured to a vehicle body. The bracket 10 has a pedal shaft on which a parking brake pedal 11 is rotatably pivoted at an intermediate portion thereof, a stopper shaft on which a stopper member 12 made of an elastic member such as rubber is securely positioned, a panel pin on which a panel 13 is rotatably pivoted and a release pin on which a release lever 14 is rotatably pivoted. The bracket 10 further comprises a guide portion for a release cable 15 which is connected to a release knob (not shown) and another guide portion for a parking brake cable 16 which is connected to a parking brake device (not shown).

A sector 17 which has a ratchet wheel 17a which is secured, by means of pins, to an end portion of the parking brake pedal 11 at a side of the pedal opposite to the foot operator portion. One end of the parking brake pedal 11 is positioned at the lower part of the sector 17 in FIG. 1 and is connected to the cable 16. The panel 13 which is of approximately V-shaped configuration, in cross section, faces the sector 17 so that a panel portion 13a is engageable with the ratchet wheel 17a. The panel 13 is always urged into a counterclockwise direction by a spring 18 which has one end seated against the end frame of the bracket 10 and the other end of which is seated against a side portion of a lever portion 13b of the panel 13. In other words, the panel 13 is always urged into the direction wherein the panel portion 13a is brought in engagement with the ratchet wheel 17a of the sector 17.

The release lever 14 has a raised portion 14a at one end thereof which is brought in contact with the lever portion 13b of the panel 13 whereby the release lever 14 is urged into counterclockwise direction by means of the spring 18 through the engagement between the raised portion 14a and the lever portion 13b. Slack in the release cable 15 when the parking brake is in a non-operated condition is prevented since the release lever 14 which is connected to the release cable 15 at the right end of the release lever 14 is urged into the counterclockwise direction by means of the spring 18. When the parking brake is in the operated condition wherein the ratchet wheel 17a is in engagement with the panel portion 13a, a gap of predetermined width is formed between the level portion 13b of the panel 13 and the raised portion 14a of the release lever 14.

The stopper member 12 is adapted to receive the return movement of the parking brake pedal 11 to thereby reduce the shock when the parking brake pedal 11 is moved into the illustrated non-operated condition from the operated condition. A switch 20 is positioned on the bracket 10 to indicate that the parking brake is in an operated or engaged condition. The switch 20 is actuated by one end of a leaf spring 19. The other end of the spring is mounted on the parking brake pedal 11. The switch 20 has a contact actuating member 20a and a spring, no shown, to urge the contact actuating member 20a into the switch actuating direction. When the parking brake is in its non-operated condition, the contact actuating member 20a is urged by means of the leaf spring 19 against the unillustrated spring to urge the contact actuating member 20a into the switch actuating direction so that the switch 20 is brought into an indicating off position or condition. When the parking brake is operated by the counterclockwise rotation of the parking brake pedal 11, the leaf spring 19 is moved out of contact from the contact actuating member 20a and then the contact actuating member 20a is moved by means of the unillustrated spring into the switch actuating direction to thereby bring the switch 20 into an on indicating position or condition. The switch actuating member 20a is movable within the switch 20 through a predetermined stroke of, for example, less than 10 mm.

As shown in FIGS. 2 and 3, one end of the leaf spring 19 is interengaged with a plurality of clasp portions or projections 11a, 11b and 11c. The spring 19 has at its intermediate portion a curved portion 19a which projects towards the non-operated direction of the switch 20, i.e., the off position (direction of arrow C). The spring 19 further has at its other end a contact portion 19b which is engageable with the switch actuating member 20a of the switch 20. The leaf spring 19 which is, it its free condition, positioned as shown in the dotted chain lines in FIG. 3 is held by a clasp portion 11d formed on the parking brake pedal 11 when the leaf spring 19 is assembled. Thus, the leaf spring 19 is assembled under the predetermined bent condition toward the direction of arrow C and has a spring characteristic as shown in FIG. 4 which illustrates the relation between the magnitude in bend (mm) and load (kg) in the directions of arrows C and D. Thus, the leaf spring 19 can be set as small spring constant which has a small load change even when the magnitude of bending is greatly changed.

In operation, when the parking brake pedal 11 is depressed, the pedal 11 is rotated about the pedal shaft in a counterclockwise direction from that shown in FIG. 1. The contact portion 9b of the leaf spring 19 is spaced from the contact actuating member 20a and the switch 20 is brought in its on condition or position. At the same time, the parking brake cable 16 is pulled up to cause the parking brake device to activate the parking brake and the ratchet wheel 17a of the sector 17 is brought in engagement with the panel portion 13a of the panel 13 to thereby maintain the parking brake operation even when the driver releases his foot from the pedal 11.

When the release knob is pulled and the release lever 14 is rotated in the clockwise direction in FIG. 1 through means of the release cable 15, the raised portion 14a is brought into contact with the lever portion 13b of the panel 13. The panel 13 is then rotated in the clockwise direction in FIG. 1 against the biasing force of the spring 18 and the engagement between the ratchet wheel 17a and the panel portion 13a is released. This release allows the clockwise rotation of the parking brake pedal 11 by means of the parking brake cable 16 and the pedal 11 is brought in contact with the stopper 12 and is returned in its original position. The contact portion 19b of the leaf spring 19 is brought in contact with the contact actuating member 20a so to move the member 20. This movement permits the switch to be brought into its off condition or position.

Under these conditions, even when the stopper is bent or otherwise deformed by the pedal 11 and the parking brake pedal 11 is rotated into the clockwise direction so as to cause the contact portion 19b of the leaf spring 19 to move the switch actuation means 20a through the predetermined travel stroke of the switch actuating means 20a, any damage to the switch due to over-travel of the pedal through the stroke of the switch actuating means 20a is prevented by bending of the leaf spring 19 since the leaf spring 19 is held by the clasp portion 11d with its predetermined bent condition towards the direction of arrow C as shown in FIGS. 2 and 3 and therefore the leaf spring 19 has the characteristic shown in FIG. 4. This means that the load of the leaf spring 19, as provided with a preloading, is set so as to cause the switch 20 to actuate and the load P1, in the use range of the leaf spring 19, is set within the load P2 of the above-discussed unillustrated spring, within the switch 20, which is within the stroke of the switch actuating means 20a of the switch. The spring constant of the leaf spring 19 is different in each direction of movement, namely the direction of arrows C and D as shown in FIG. 3 and, therefore, the leaf spring 19 is prevented from vibrating in both directions of movement, even when the parking brake pedal 11 is returned to an off position. This prevents noise and increases the durability of the leaf spring 19.

Obviously, numerous modifications and variations of the present invention are possible in light of the above teachings. More particularly, mounting positions of the switch and the leaf spring and the types (such as plunger type and lever type) of the manipulating device for the parking brake device may be changed. It is therefore to be understood that within the scope of the appended claims, the invention may be practiced otherwise than as specifically described herein.

What is claimed is:

1. A manipulating device for a parking brake comprising a bracket secured to a vehicle body, a parking brake actuating means movably positioned on said bracket, leaf spring means having one end secured to one of said bracket and said parking brake actuating means and a switch mounted on one of said bracket and said parking brake actuating means, a switch actuating means brought into contact with the opposite end of said leaf spring means when said parking brake actuating means is in a first position, stopper means secured to said bracket and positioned to be contacted by said parking brake actuating means when said parking brake actuating means is rotated clockwise to a non-actuated state, said clockwise rotation initiating contact between said leaf spring and said switch actuating means so as to move the switch to an off condition, and a region of said opposite end of said leaf spring being elastically retained with a predetermined bent condition which is opposite to a direction of movement of said switch actuating means as determined by movement of said parking brake actuating means.

2. A manipulating device for a parking brake as set forth in claim 1 wherein said parking brake actuating means is a foot-type parking brake pedal.

3. A manipulating device for a parking brake as set forth in claim 1 wherein said leaf spring has an intermediate curved portion which projects towards a non-operating direction of said switch and the region of said opposite end of said leaf spring held by a clasp portion of said parking brake actuating means.

4. A manipulating device for a parking brake as set forth in claim 1 wherein said one end of said leaf spring is held by clasp portions formed on said parking brake actuating means.

* * * * *